United States Patent [19]

Speak et al.

[11] Patent Number: 5,868,488
[45] Date of Patent: Feb. 9, 1999

[54] ADJUSTABLE HEADLIGHTS, HEADLIGHT ADJUSTING AND DIRECTION SENSING CONTROL SYSTEM AND METHOD OF ADJUSTING HEADLIGHTS

[76] Inventors: Justin R. Speak; Michael J. Barnes, both of 5843 Dudley, Taylor, Mich. 48180

[21] Appl. No.: 751,504

[22] Filed: Nov. 18, 1996

[51] Int. Cl.$^6$ .................................................. B60Q 1/076
[52] U.S. Cl. .............................. 362/37; 362/66; 362/71; 362/40
[58] Field of Search ................................ 362/37, 40, 66, 362/71, 419, 420, 423, 287, 427, 428

[56] References Cited

U.S. PATENT DOCUMENTS

| | | | |
|---|---|---|---|
| 4,118,765 | 10/1978 | Atsuchi | 362/384 |
| 4,217,627 | 8/1980 | Toimita et al. | 362/71 |
| 4,293,893 | 10/1981 | Tsuzuki et al. | 362/38 |
| 4,858,080 | 8/1989 | Oikawa | 362/61 |
| 5,099,400 | 3/1992 | Lee | 362/37 |
| 5,416,465 | 5/1995 | Lin | 362/37 |
| 5,580,148 | 12/1996 | Liao | 362/37 |
| 5,588,733 | 12/1996 | Gotou | 362/37 |

Primary Examiner—Thomas M. Sember
Attorney, Agent, or Firm—Joseph N. Breaux

[57] ABSTRACT

An adjustable headlight and headlight adjusting direction sensing control system which incrementally adjusts the Y axis of an automobile headlight in accordance with the vehicle turning direction and adjusts the X axis in accordance with the hood orientation in relation to the road topography. A method for adjusting the X axis and Y axis of the adjustable headlights for enhancing the illumination of the changing forward road topography. The automobile headlight and the headlight adjusting and direction sensing control system comprises a pair of adjustable headlights, a pair of servomotors systems, first sensor, second sensor and microprocessor. The adjustable headlights are coupled to a pair of servomotors of one of the servomotor systems for adjusting the adjustable headlights along its X axis or Y axis in accordance with the output signals from the microprocessor. The microprocessor is further coupled to the first sensor for determining whether the vehicle is turning left or right and adjusting the adjustable headlights and the second sensor for determining the hood orientation based on the road topography and adjusting the adjustable headlights along is X axis.

2 Claims, 4 Drawing Sheets

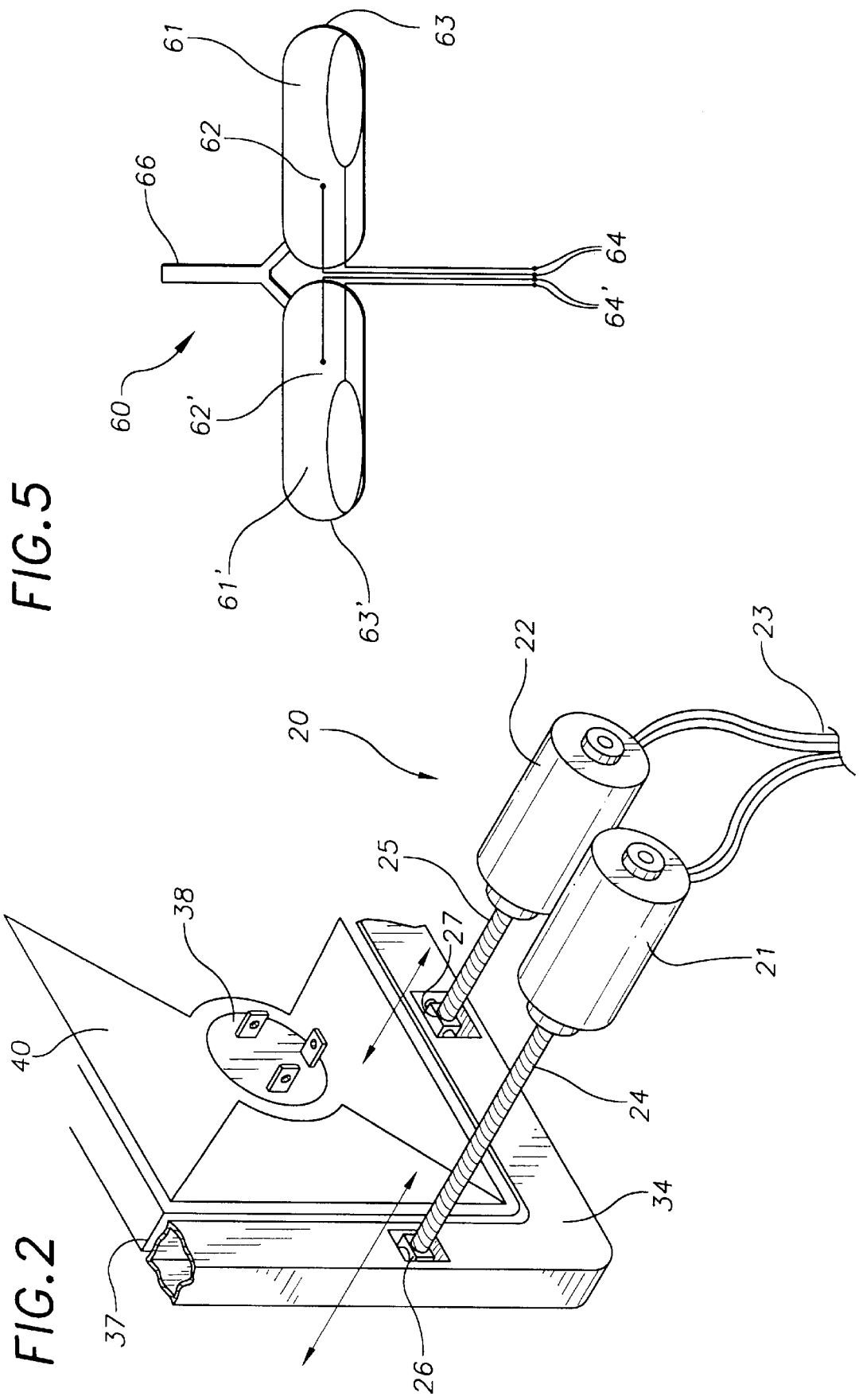

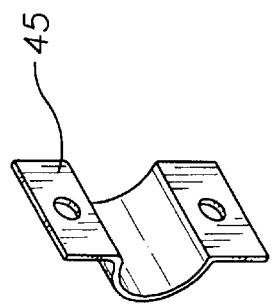
FIG.3b
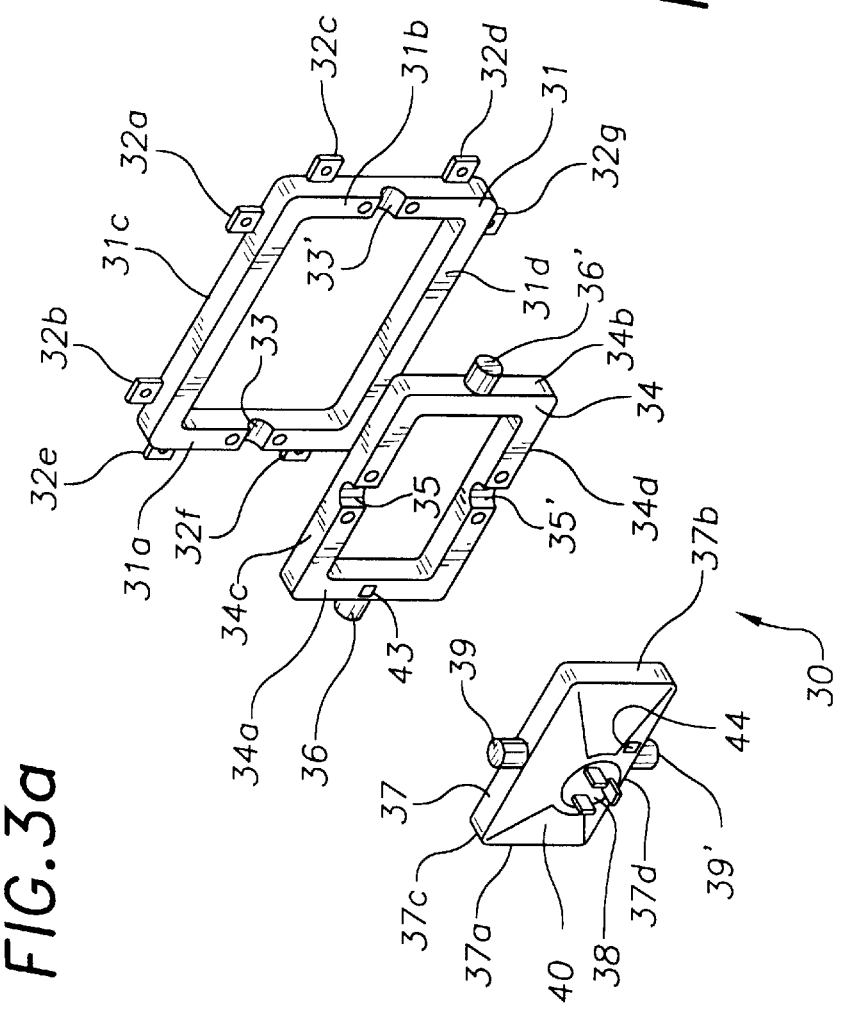
FIG.3a
FIG.4

ADJUSTABLE HEADLIGHTS, HEADLIGHT ADJUSTING AND DIRECTION SENSING CONTROL SYSTEM AND METHOD OF ADJUSTING HEADLIGHTS

TECHNICAL FIELD

The present invention relates to automobile headlights, headlight adjusting and direction sensing control system and a method for adjusting automobile headlights, and more particularly, to adjustable headlights and headlight adjusting and direction sensing control system which incrementally adjusts the Y axis of the adjustable headlights in accordance with the vehicle turning direction and adjusts the X axis in accordance with the hood orientation in relation to the road topography. The present invention further relates to a method for adjusting the X axis and the Y axis of adjustable headlights thereby enhancing the illumination of the changing forward road topography.

BACKGROUND OF THE INVENTION

Typically, automobile headlights are mounted on the front end of an automotive vehicle body. These lights are stationary and only illuminate the road surface directly straight ahead based on an illumination angle of the headlights. Since the automobile headlights illuminate the surface straight ahead proportionate to the illumination angle, as the road curves, the automobile headlights do not adequately illuminate the road surface immediately to the left or right in relation to the curved road. Henceforth, an obstruction immediately to the left or right may not be illuminated and a driver of the vehicle may not have enough time to maneuver the vehicle away from the obstruction thereby potentially causing an accident. Furthermore, a driver may not be abreast of the topography of the road and sharper curves are extremely hazardous.

Moreover, when a vehicle travels up or down a mountain or hill, stationary headlights do not adequately illuminate the upward or downward sloping road topography thereby hindering the visual capability of the driver of the vehicle.

To overcome the above aforementioned problems, several automobile headlight systems have been patented which are aimed at automobile headlights and headlight adjusting systems.

The known vehicle headlight and headlight adjusting apparatuses do not address the need for adjustable headlights and headlight adjusting and direction sensing control system which incrementally adjusts the Y axis of the adjustable headlights in accordance with the vehicle turning direction and adjusts the X axis in accordance with the hood orientation in relation to the road topography. The present invention further addresses the need for a method for adjusting the X axis and the Y axis of adjustable headlights thereby enhancing the illumination of the changing forward road topography.

SUMMARY OF THE INVENTION

The preferred embodiment of the present invention solves the aforementioned problems in a straight forward and simple manner. What is provided is adjustable headlights and headlight adjusting and direction sensing control system which incrementally adjusts the Y axis of the adjustable headlights in accordance with the vehicle turning direction and adjusts the X axis in accordance with the hood orientation in relation to the road topography. Further provided is a method for adjusting the X axis and the Y axis of adjustable headlights thereby enhancing the Illumination of the changing forward road topography.

In operation, the adjustable headlight and the headlight adjusting and direction sensing control system for use in a vehicle comprises at least one means for illuminating having an X axis and a Y axis; a first sensor means for detecting a turning direction of said vehicle; a second sensor means for detecting a hood orientation in relation to the road topography; and at least one control means for rotating the at least one illuminating means on said X axises in response to said second sensor means and rotating said at least one illuminating means on said Y axises in response to said first sensor means.

In view of the above, it is an object of the present invention to provide adjustable headlights and headlight adjusting and direction sensing control system for adjusting the at least one means for illuminating along its Y axis as a vehicle turns left or right thereby reducing the risk of a potential accident when a vehicle proceeds around a sharp curvature of the road topography.

It Is a further object of the present invention to provide such adjustable headlights which are simple in construction and easily rotatable for altering the illumination angle thereof.

Another object of the present invention is to provide adjustable headlights and headlight adjusting and direction sensing control system for adjusting the at least one means for illuminating along its X axis in relation to the hood orientation in accordance with road topography for enhancing the illumination of the upward or the downward road topography of a hill or mountain.

It is thus an object of the invention to provide a sensor means for detecting the hood orientation and a sensor means for detecting the turning direction of a vehicle which are simple in construction.

It is a further object of the invention to provide adjustable headlights and headlight adjusting and direction sensing control system that is easily adaptable and attachable for use in all manufactured automobiles or vehicles.

It is a still further object of the invention to provide adjustable headlights and headlight adjusting and direction sensing control system that reduces power consumption and power drains on a conventional vehicle battery or other suitable energy generator.

The above objects and other features of the present invention will become apparent from the drawings, the description given herein, and the appended claims.

BRIEF DESCRIPTION OF THE DRAWINGS

For a further understanding of the nature and objects of the present invention, reference should be had to the following detailed description, taken in conjunction with the accompanying drawings, in which like elements are given the same or analogous reference numbers and wherein:

FIG. 2 illustrates the headlight rotation control means and a partial view of an adjustable headlight of the embodiment of FIG. 1;

FIG. 3a illustrates an exploded back view of the adjustable headlight structure of the embodiment of FIG. 1;

FIG. 3b illustrates a view of a plate for fixedly securing the frame rotation rods of the interior frame member and the headlight frame member of the adjustable headlight structure of the embodiment of FIG. 3a;

FIG. 4 illustrates a front view of an alternative embodiment of an adjustable headlight structure, assembled, of the present invention;

FIG. 5 illustrate a schematic diagram of the sensor means for detecting the hood orientation in relation to the road topography of the embodiment of FIG. 1.

DESCRIPTION OF THE EXEMPLARY EMBODIMENT

Figure 1:
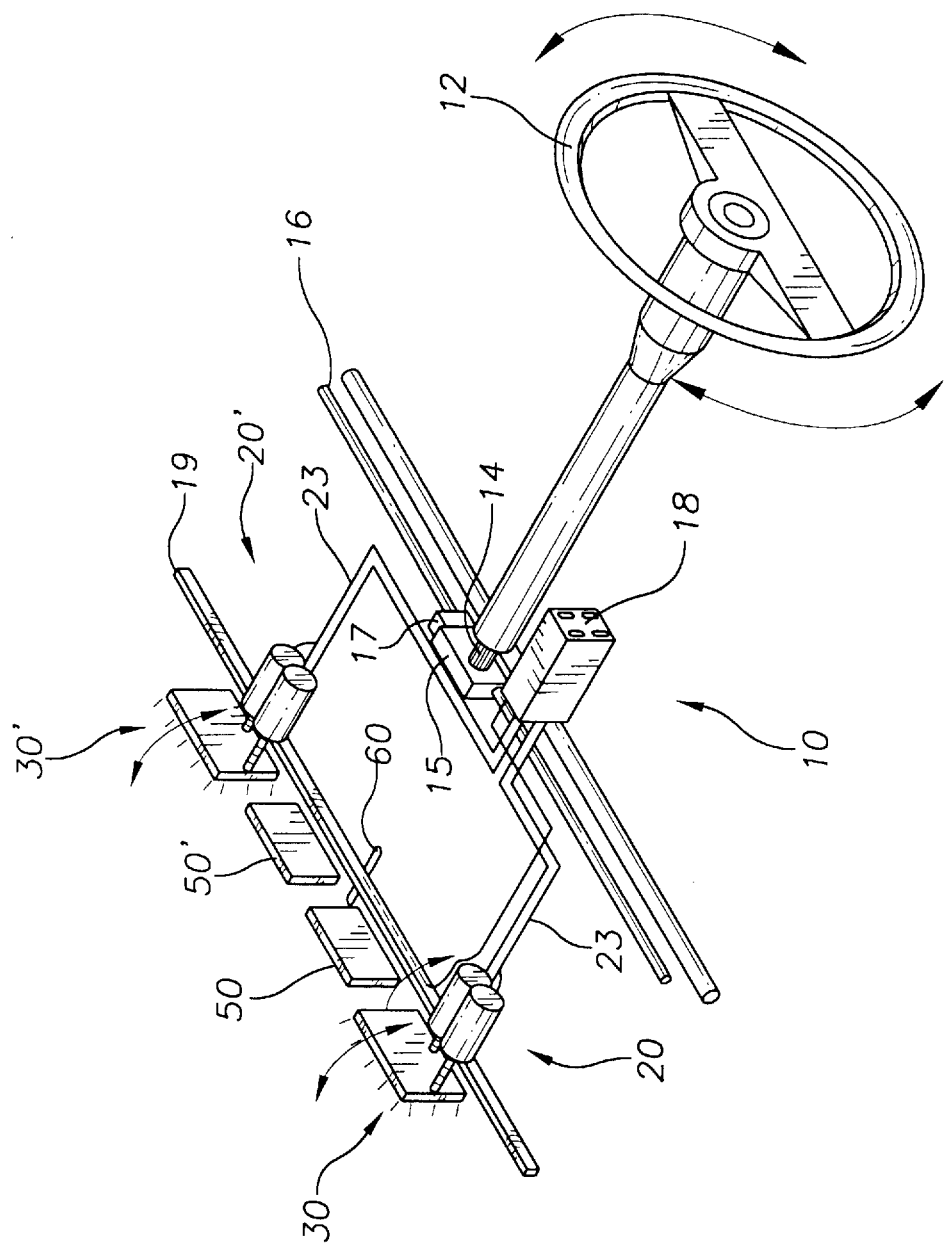
FIG. 1 illustrates the adjustable headlights and the headlight adjusting and direction sensing control system of the preferred embodiment of the present invention.

Referring now to the drawings, and in particular FIG. 1, a schematic diagram of adjustable headlights and headlight adjusting and direction sensing control system of the present invention is shown. The adjustable headlights and the headlight adjusting and direction sensing control system is designated generally by the numeral 10 and is generally comprised of steering wheel 12, gear shaft 14, gear box 15, front wheel axil rod 16, front end frame structure 19, stationary headlights 50 and 50' and system microprocessor 18. Steering wheel 12, gear shaft 14, front wheel axle rod 16, front end frame structure 19 and stationary headlights 50 and 50' are conventional components manufactured by known automobile and\ or vehicle manufacturers. However, stationary headlights 50 and 50' are slightly moved left or right from their original position thereby facilitating the placement of adjustable headlight structures 30 and 30'.

Adjustable headlights and headlight adjusting apparatus and direction sensing control system 10 further comprises sensor means 17, sensor means 60, adjustable headlight structures 30 and 30' and two headlight rotating control means 20 and 20'. Gear box 15 is interfaced with sensor means 17 for detecting the turning direction of the vehicle in accordance with the rotation direction of steering wheel 12. In the exemplary embodiment, sensor means 17 is a rotary digital generator which produces digital square waves when steering wheel 12 is turned left or right. Nevertheless, sensor means 17 is not limited to only a rotary digital generator.

System microprocessor 18 couples to the output of sensor means 17 via wiring (not shown) and processes the output signals therefrom. System microprocessor 18 in turn calculates a left or a right adjustment factor incrementally for adjustable headlight structures 30 and 30' for rotating the illumination angle about the Y axis. Specifically, as the vehicle turns left, sensor means 17 detects when the vehicle is turning left. The output signals of sensor means 17 is processed by system microprocessor 18. System microprocessor 18 sends the incrementally calculated left adjustment factor control signal to the two headlight rotating control means 20 and 20'. Henceforth, adjustable headlight structures 30 and 30' are incrementally rotated left in synchronism thereby rotating the illumination angle left within the range of 0 degrees to 90 degrees, incrementally, with 0 degrees being the original position and 90 degrees being the maximum amount of rotation.

Accordingly, as the vehicle turns right, the adjustable headlight structures 30 and 30' are incrementally rotated right in synchronism. System microprocessor 18 sends the incrementally calculated right adjustment actor control signal to the two headlight rotating control means 20 and 20'. Henceforth, adjustable headlight structures 30 and 30' are incrementally rotated right in synchronism thereby rotating the illumination angle right within the range of 0 degrees to 90 degrees, incrementally, with 0 degrees being the original position and 90 degrees being the maximum amount of rotation. Henceforth, the forward road along a curve or corner is illuminated, in accordance with the rotated illumination angle. Since headlight rotating control means 20 and 20' are identical, it will be necessary to describe only one such headlight rotating control means in detail.

FIG. 2 illustrates a schematic diagram of headlight rotating control means 20. Headlight rotating control means 20 comprises X axis servomotor 21, Y axis servomotor 22, wiring means 23, first shaft 24, second shaft 25, X axis rotation control mechanism 26 and Y axis rotation control mechanism 27. Wiring means 23 couples to system microprocessor 18 (FIG. 1) and to the inputs of X axis servomotor 21 and Y axis servomotor 22, respectively. X axis servomotor 21 and Y axis servomotor 22 have coupled thereto first rotating shaft 24 and second rotating shaft 25, respectively. First rotating shaft 24 and second rotating shaft 25 have coupled thereto X axis rotation control mechanism 26 and Y axis rotation control mechanism 27, respectively. Accordingly, as X axis servomotor 21 operates to rotate first rotating shaft 24, X axis rotation control mechanism 26 rotates interior frame member 34 from 0 degrees to 90 degrees based on the left or right adjustment factor thereby rotating the illumination angle proportionately. On the other hand, as Y axis servomotor 22 operates to rotate second rotating shaft 25, Y axis rotation control mechanism 27 rotates headlight frame member 31 from 0 degrees to 90 degrees based on the upward or downward adjustment factor thereby rotating the illumination angle proportionately.

Interior frame member 34 has formed therein a recess for housing therein X axis rotation control mechanism 26. Headlight frame 37 has formed therein a recess for housing therein Y axis rotation control mechanism 27.

Since each of adjustable headlight structures 30 and 30' are identical, it will be necessary to describe only one such adjustable headlight structure in detail. FIG. 3 illustrates an exploded back view of adjustable headlight structure 30. Adjustable headlight structure 30 comprises exterior frame member 31, interior frame member 34, headlight frame member 37 and Illuminating means housing 40. Exterior frame member 31 is shaped substantially rectangularly and comprises legs 31a, 31b, 31c and 31d. Legs 31a and 31b have formed therein semi-cylindrical recesses 33 and 33', respectively. Additionally, exterior frame member 31 has formed therein a plurality of hole pairs wherein one hole of a hole pair is located just above recess 33 and the other hole of said hole pair is located just below recess 33. Additionally, one hole of another hole pair is located just above recess 33' and the other hole of said another hole pair is located just below recess 33'. Each hole of the plurality of hole pairs is formed to receive therein a screw (not shown) or other suitable means of securing.

The outer perimeter of the front face of exterior frame member 31 has fixed coupled thereto a plurality of support connectors 32a, 32b, 32c, 32d, 32e, 32f, and 32g for connecting exterior frame member 31 to the front end of She vehicle. Each of support connectors 32a, 32b, 32c, 32d, 32e, 32f, and 32g have formed therein a recess for receiving a bolt or other suitable attachment mechanism for securing support connectors 32a, 32b, 32c, 32d, 32e, 32f, and 32g to the front end of the vehicle. Although, support connectors 32a–32g are shown, the number of support connectors is not limited to five support connectors. Preferably, there are an even number of connectors such as 2, 4, 6, 8, etc., wherein the number of connectors is a function of the size and shape of exterior frame member 31.

interior frame member 34 is shaped substantially rectangularly and dimensioned such that the outer perimeter of interior fame member 34 is slightly smaller than the inner perimeter of exterior frame member 31. Interior frame member 34 comprises legs 34a, 34b, 34c and 34d wherein legs 34c and 34d have formed therein semi-cylindrical recesses 35 and 35', respectively. Additionally, interior frame member 34 has formed therein a plurality of hole pairs wherein one hole of a hole pair is located just to the right of recess 35 and the other hole of a hole pair is located just to the left of recess 35. Additionally, one hole of another hole pair is located just to the right of recess 35' and the other hole of said another hole pair is located just to the left of recess 35'. Each hole of the plurality of hole pairs is formed to receive therein a screw (not shown) or other suitable means of securing. Interior frame member 34 further comprises frame rotation rods 36 and 36' coupled centrally to the exterior side surface of legs 34a and 34b, respectively, which matingly couple into recesses 33 and 33', respectively, for rotation therein. Proximate to frame rotation rod 36, leg 34a has formed therein is an aperture 43 for receiving therein first rotating shaft 24 (FIG. 2).

Headlight frame member 37 is shaped substantially rectangularly and dimensioned such that the outer perimeter of headlight frame member 37 is slightly smaller than the inner perimeter of interior frame member 34. Headlight frame member 37 comprises legs 37a, 37b, 37c and 37d. Headlight frame member 37 further comprises frame rotation rods 39 and 39' coupled centrally to the top surface on leg 37c and centrally to the bottom surface of leg 37d, respectively, which matingly couple into recesses 35 and 35', respectively, for rotation therein. Proximate to frame rotation rod 39', the back surface area of illuminating means housing 40 has formed therein an aperture 44 for receiving therein second rotating shaft 25 (FIG. 2). Headlight frame member 37 has fixedly coupled to the interior surface thereof illuminating means housing 40.

Illuminating means housing 40 comprises connector plug 38 centrally located on the back surface area of illuminating means housing 40 for connection to an electrical outlet provided in the front end of the vehicle. When connector plug 38 is coupled to the electrical outlet, energy flows through connector plug 38 to the light fixture (not shown), thereby illuminating said light fixture.

In the exemplary embodiment, the overall shape of adjustable headlight structure 30 is substantially rectangular. Nonetheless, adjustable headlight structure 30 may be modified to be substantially circular in shape by equally modifying the shape of exterior frame member 31, interior frame member 34 and headlight frame member 37. Accordingly, adjustable headlight structure 30 may be of any shape that will provide the desired illumination angle for illuminating the road topography. Additionally, the exemplary embodiment, illustrates two separate structures for adjustable headlight structures 30 and 30' and stationary structures 50 and 50'. Nevertheless, adjustable headlights 30 and 30' of the present invention may be unitarily formed together with stationary headlight 50 and 50' wherein stationary headlights 50 and 50' will not have their illumination angle rotated.

FIG. 3b illustrates a view of a plate for fixedly securing the frame rotation rods of the interior frame member and the headlight frame member of adjustable headlight structure 30 and 30'. Adjustable headlight structures 30 and 30' comprise a plurality of plates 45. Since each of plates 45 are identical, it will be necessary to describe only one such plate in detail. Plate 45 has a centrally located semi-cylindrical curvature for mating connection to frame rotation rods 36 and 36' and 39 and 39' and proportionate to recesses 33 and 33' and 35 and 35'. The top and bottom surface areas each have formed therein holes with matingly couple to said hole pairs of exterior frame member 31 and said hole pairs of interior Frame member 34. The width of plate 45 is limited to the width of the legs 31a and 31b of exterior frame member 31 and legs 34c and 34d of interior frame member 31, such that plate 45 does not in any way inhibit the rotation of interior frame member 34 or headlight frame member 37. Nevertheless, plate 45 is coupled to exterior frame member 31 and interior frame member 34 via said screws (not shown) or other suitable means for securing.

FIG. 4 illustrates a front view of an alternative embodiment of adjustable headlight structure 30", assembled. Adjustable headlight structures 30, 30' and 30" further comprise headlight glass front 42 for passing therethrough the illumination of the light fixture (not shown). Headlight glass front 42 in combination with the light fixture and illuminating means housing 40 are hereinafter referred to as a means for illuminating. The means for illuminating is designed to have an illumination angle. In the alternative embodiment, interior frame member 34' rotates about the Y axis and headlight frame member 37' rotates about the X axis; henceforth, as the interior frame member 34' rotates about the Y axis and headlight frame member 37' rotates about the X axis, said means for illuminating is adjusted on its X axis and its Y axis for adjusting the position of the illumination angle. In the alternative embodiment, said X axis and Y axis servomotors are switched accordingly, as well as, the placement of said frame rotation rods (as shown).

FIG. 5 illustrates a schematic diagram of sensor means 60. Sensor means 60 comprises downward detection switch 61 and upward detection switch 61', switch contacts 62 and 62', encapsulating housings 63 and 63', electrical wires means 64 and 64' and mounting bracket 66. Mounting bracket 66 couples to front end frame member Mounting bracket 66 is a side view of mounting bracket 66. Mounting bracket 66 comprises an aperture (not shown) for receiving therein a bolt or other suitable securing means. Preferably, downward detection switch 61 and upward detection switch 61' are mercury switches. Since downward detection switch 61 and upward detection switch 61' are identical in structure only one such detection switch will be described in detail. Downward detection switch 61 and switch contact 62 are encased in encapsulating housing 63. Electrical wires 64 coupled to switch contact 62 and downward detection switch 61, respectively, for delivering control detection signals to system microprocessor 18 (FIG. 1).

Downward detection switch 61 and upward detection switch 61' differ only in that downward detection switch 61 detects if the hood is pointed in a downward direction when the vehicle Is on a sloping road topography, such as a mountain or hill. On the other hand, upward detection switch 61' detects if the hood of the vehicle is pointed in an upward direction when the vehicle is on a sloping road topography, such as a mountain or hill. Furthermore, downward detection switch 61 and upward detection switch 61' are normally in an open position (as shown). Alternatively, detection switches 61 and 61' may be normally in the closed position.

If a vehicle moves in an upward direction on a sloping road topography, such as a mountain or hill, switch 61' detects said upward direction and switch 61' closes. If a vehicle moves in a downward direction on a sloping road topography, switch 61 detects said downward direction and switch 61 closes. System microprocessor 18 detects when switches 61 and 61' are closed and calculates a downward or a upward adjustment factor The following description will be directed to the operation and method of adjusting headlights of the present invention.

Figure 6:
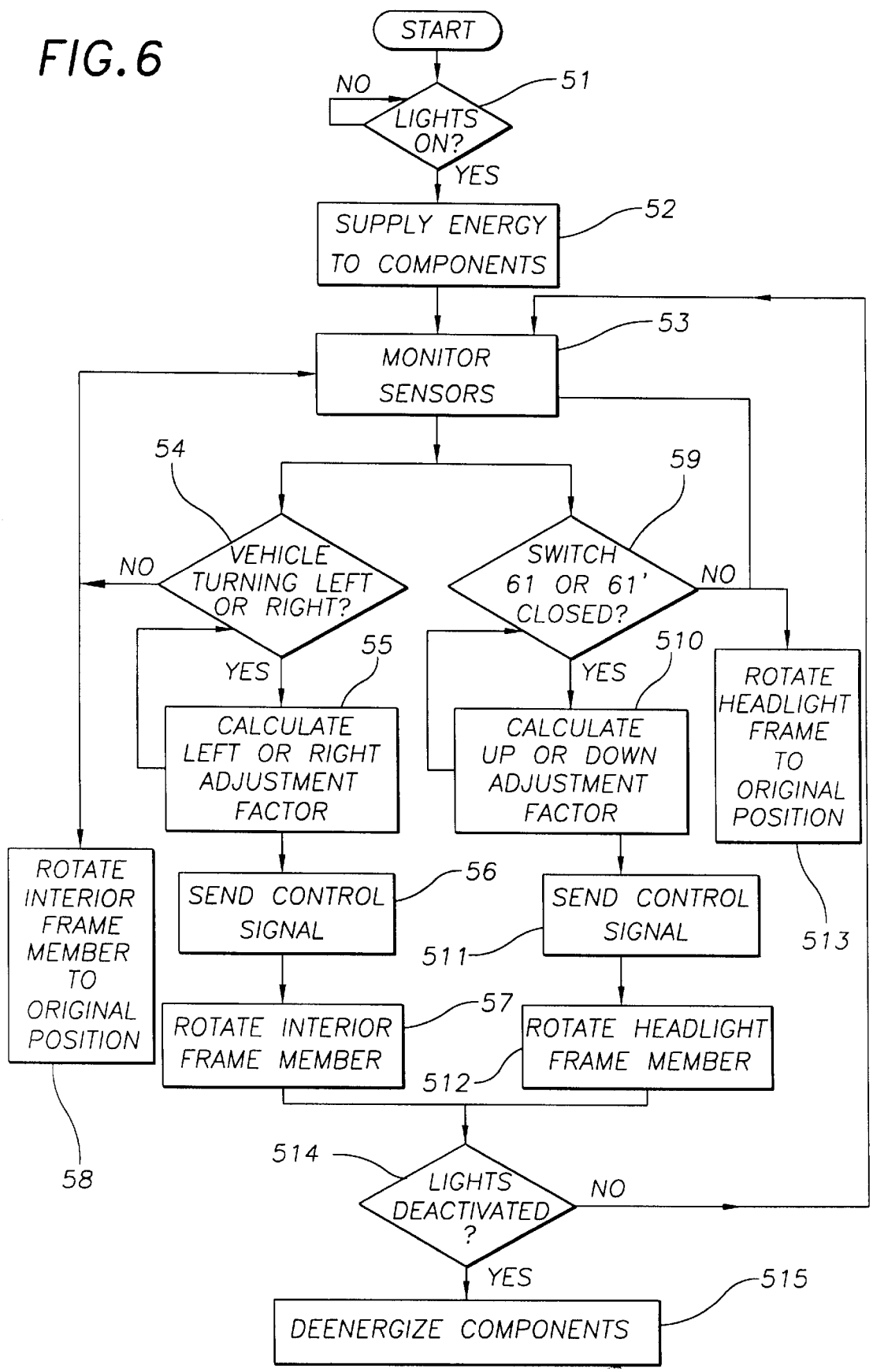
FIG. 6 is a flow chart of the method for adjusting the X axis and Y axis of the present invention.

Referring now to FIG. 6, a flowchart of the method of adjusting headlights along the X axis and the Y axis of the present invention is shown. When the automobile or vehicle is in operation, and more specifically, when in operation during the dusk and night hours or during adverse weather conditions, the user of the vehicle turns the stationary lights of the vehicle on. Preferably, when the vehicle turns the stationary lights of the vehicle on, similarly the light fixture of adjustable headlight structures 30 and 30' should be activated and turned on (in step S1) by supplying energy to connector plug 38 via a conventional battery or other suitable energy generating means. Preferably, the other electrical components of the present invention, such as system microprocessor 18, servomotor headlight rotating control means 20 and 20' and sensor means 17 and 60, receive energy at the same time (in step S2) for reducing power consumption and power drain on the conventional battery or other suitable energy generator. However, during manufacturing system microprocessor 18 may be integrated with the other control logic components of the vehicle or automobile and powered accordingly.

Henceforth, if the headlights of the vehicle or automobile have been activated and turned on (in step S1) system microprocessor 18 monitors the outputs of sensor 17 and sensor 60, simultaneously (in step S3). The present invention adjusts the X axis and the Y axis of the adjustable headlight simultaneously. However, based on the destination of the vehicle and road topography, the present invention need only alter the X axis or Y axis at any given time. Accordingly a determination is made whether the vehicle is turning left or right (in step S4) from the output of sensor means 17. If the vehicle is turning left adjustable headlight structures 30 and 30' are rotated left incrementally in relation to the calculated left adjustment factor (in step S5) proportionate to the rotation of steering wheel 12. If the vehicle is turning right, adjustable headlight structures 30 and 30' are rotated right incrementally in relation to the calculated right adjustment factor (in step S5) proportionate to the rotation of steering wheel 12. System microprocessor 18 send control signals (in step S6) to Y axis servomotor 22. Y axis servomotor 22 in turn controls Y axis rotation control mechanism 27 to rotate interior frame member 34 (in step S7) to the left or right based on the calculated left or right adjustment factor (in step S5). System microprocessor 18 continuously monitors the output of sensor means 17 wherein after a vehicle has turned either right or left and continues along a substantially straight road surface, adjustable headlight structures 30 and 30' are rotated back into their original Y axis position (in step S8).

If the vehicle is traveling up or down a mountain or a hill, the hood orientation with respect to the road topography is directed upward causing switch 61' to close or downward causing switch 61 to close. System microprocessor 18 detects that 61 or 61' has closed (in step S9). System microprocessor 18 calculates an up or a down adjustment factor (in step S10) and sends control signals (in step S11) to X axis servomotor. X axis servomotor 21 in turn controls X axis rotation control mechanism 26 to rotate headlight frame member 37 (in step S12) upward or downward based on the calculated up or down adjustment factors. System microprocessor 18 continuously monitors the output of sensor means 60 wherein after a vehicle begins to proceed on a flat road topography, switch 61 or 61' opens again and adjustable headlight structures 30 and 30' are rotated back into their original X axis position (in step S13)

When it is determined that adjustable headlight structures 30 and 30' are deactivated or turned off (in step S14), said electrical components of the present invention are deactivated (in step S15) thereby reducing power consumption and power drains on the conventional battery or other suitable energy generator. Otherwise, if the lights are not turned of (in step S14) system microprocessor 18 continuously monitor sensor means 17 and 60 (in step S3).

It is noted that the embodiment of the adjustable headlights the headlight adjusting and direction sensing control system and the method of adjusting headlights described herein in detail for exemplary purposes is of course subject to many different variations in structure, design, application and methodology. Because many varying and different embodiments may be made within the scope of the inventive concept(s) herein taught, and because many modifications may be made in the embodiment herein detailed in accordance with the descriptive requirements of the law, it is to be understood that the details herein are to be interpreted as illustrative and not in a limiting sense.

What is claimed is:

1. An adjustable headlight and a headlight adjusting and direction sensing control system for use in a vehicle, said adjustable headlight and the headlight adjusting and direction sensing control system comprising:

at least one means for illuminating having an X axis and a Y axis;

sensor means for detecting a hood orientation in relation to the road topography, said sensor means for detecting the hood orientation including a plurality of mercury switches; and at least one control means for rotating the at least one illuminating means on said X axis in response to said sensor means;

said sensor means for detecting the hood orientation being coupled to a front frame structure of the vehicle;

said at least one illuminating means comprising:
and exterior frame member;
an interior frame member rotatably coupled to said exterior frame member via a first rotation rod and a second rotation rod; and
a headlight frame structure rotatably coupled to said interior frame member via a third rotation rod and a fourth rotation rod,
wherein as said interior frame member rotates about said first rotation rod and said second rotation rod, said headlight frame structure is rotated about said X axis and as said headlight frame structure rotates about said third rotation rod and said fourth rotation rod, said headlight frame structure is rotated about said Y axis.

2. An adjustable headlight and a headlight adjusting and direction sensing control system for use in a vehicle, said adjustable headlight and the headlight adjusting and direction sensing control system comprising:

at least one means for illuminating having an X axis and a Y axis;

a first sensor means for detecting a turning direction of said vehicle, said first sensor means being coupled to a front frame structure of said vehicle;

a second sensor means for detecting a hood orientation in relation to the road topography; and at least one control means for rotating the at least one illuminating means on said X axis in response to said second sensor means and rotating said at least one illuminating means on said Y axis in response to said first sensor means;

said at least one illuminating means comprising:

an exterior frame member;

an interior frame member rotatably coupled to said exterior frame member via a first rotation rod and a second rotation rod; and a headlight frame structure rotatably coupled to said interior frame member via a third rotation rod and a fourth rotation rod, wherein as said interior frame member rotates about said first rotation rod and said second rotation rod, said headlight frame structure is rotated about said X axis and as said headlight frame structure rotates about said third rotation rod and said fourth rotation rod, said headlight frame structure is rotated about said Y axis.

* * * * *